(No Model.)
J. F. GLIDDEN & P. W. VAUGHAN.
CULTIVATOR.
No. 378,089. Patented Feb. 21, 1888.
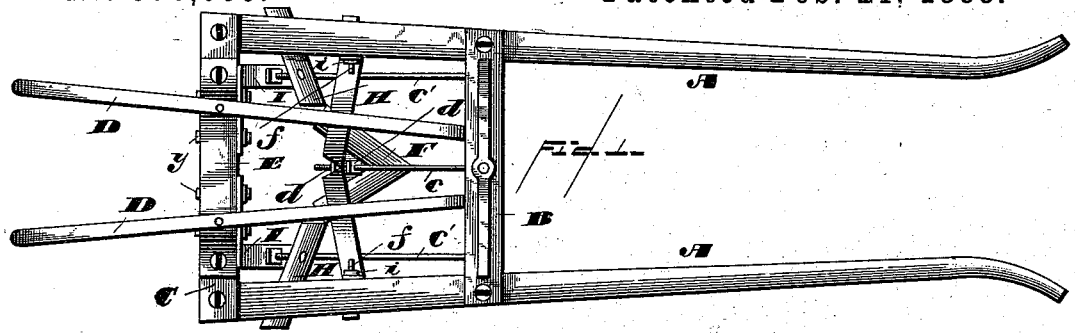
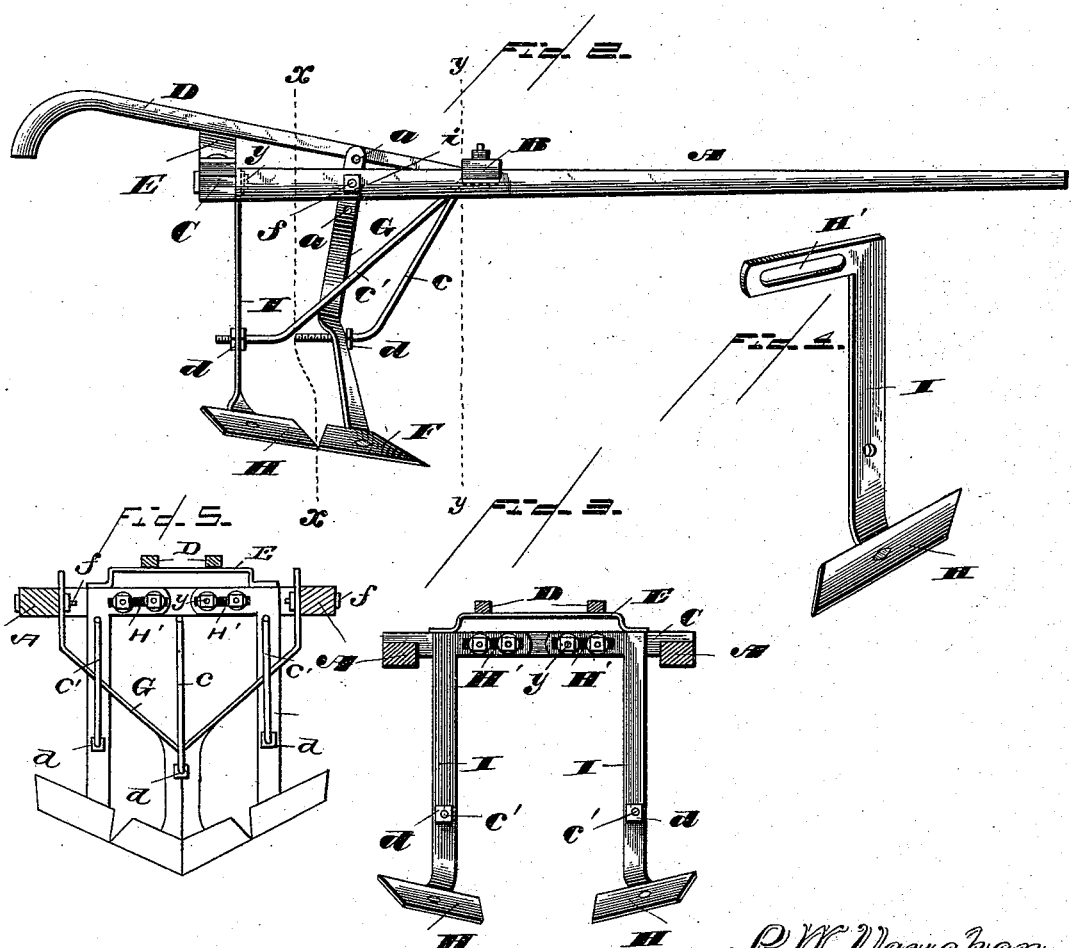
WITNESSES
P. W. Vaughan,
J. F. Glidden.
INVENTOR.
By, Smith & Sheehy,
Attorneys

UNITED STATES PATENT OFFICE.

JOSEPH F. GLIDDEN AND PHINEAS W. VAUGHAN, OF DE KALB, ILLINOIS.

CULTIVATOR.

SPECIFICATION forming part of Letters Patent No. 378,089, dated February 21, 1888.

Application filed November 16, 1887. Serial No. 255,362. (No model.)

*To all whom it may concern:*

Be it known that we, JOSEPH F. GLIDDEN and PHINEAS W. VAUGHAN, citizens of the United States, residing in the city of De Kalb, in the county of De Kalb and State of Illinois, have invented certain new and useful Improvements in Corn-Cultivators; and we do declare the following to be a full, clear, and exact description of the invention, such as will enable others skilled in the art to which it appertains to make and use the same.

This invention relates to cultivators; and it consists in the novel construction and arrangement hereinafter specified and claimed.

The nature of the invention will be fully understood from the following description and claims, when taken in connection with the annexed drawings, in which—

Figure 1 is a top plan view of our improved cultivator. Fig. 2 is a side elevation of the same. Fig. 3 is a transverse section taken on the line $x\,x$ of Fig. 2. Fig. 4 is a detail perspective view of one of our adjustable cultivator-shovels. Fig. 5 is a sectional view taken on the lines $y\,y$ of Fig. 2.

The leading object of this invention is to provide a cheap and effective implement by which a single horse may be utilized for cultivating between rows of corn or other like growing crops after the plants have attained considerable altitude. To this end we construct a cultivator of such width only as can easily be drawn between the rows without risk, and make the shovels adjustable both vertically and longitudinally, as hereinafter particularly described.

The letters A A of the drawings indicate the shafts, between which a single animal may be geared.

B indicates a cross-bar to which the whiffletree is attached, and C indicates the rear cross-bar. Said bars B and C, together with the rear portions of the shafts, form a quadrangular frame, to which the shovels and guiding-handles of the cultivator are attached. The handles are marked D on the drawings, the forward ends of which are bolted or otherwise connected with the lower side of cross-bar B. A raised bar, E, is secured to the top of cross-bar C, and serves as a support to the handles, and, furthermore, to give them the proper elevation.

F represents the front shovel of the cultivator, which is attached, by rivets or otherwise, to the bottom of standard G. This standard is bifurcated, as shown, and is made adjustable vertically by means of perforations $a\,a\,a$ and the threaded bolts $f\,f$, together with the nuts $i\,i$. This standard is furthermore made adjustable longitudinally by means of the rod $c$, provided with a threaded rear end, and the jam-nuts $d\,d$.

Our side shovels, H, are respectively attached to upright standards I, which standards are connected with the cross-bar B by rods $c'\,c'$, and to the cross-bar C at their upper ends by threaded bolts, as shown on Fig. 3 of the drawings.

It will be observed that the extreme upper ends of the bars I are bent inward and form right angles with the upright portions thereof. The upper portions are slotted at $H'\,H'$, as shown on Figs. 3 and 4. Threaded bolts $y\,y$, provided with screw-nuts, are passed through the cross-bar C, and also through the slots $H'\,H'$, respectively. The object of this last-named construction is to provide means for adjusting the position of the standards, and consequently the shovels H, to the right or left, as may be desired, and thereby regulating the width of the furrow to be plowed.

It is obvious, also, that this construction enables the operator to adapt the cultivator to wide or narrow rows of plants at will.

Having described this invention, what we claim is—

1. In a cultivator, the combination, with the frame consisting, essentially, of the shafts extended rearwardly and connected by cross-bars, the forward bifurcated standard having the upper portions of its branches perforated, the rear angular standards having their angular branches slotted, bolts for adjustably securing the said standards, and threaded rods secured to the forward cross-bar and adjustably connected with the respective standards, substantially as specified.

2. In a cultivator, the combination, with a forward bifurcated standard adapted to be vertically and longitudinally adjustable, of rearward lateral standards carrying shovels and adapted to be vertically, laterally, and longitudinally adjusted, substantially as specified.

In testimony whereof we affix our signatures in presence of two witnesses.

JOSEPH F. GLIDDEN.
PHINEAS W. VAUGHAN.

Witnesses:
SILAS O. VAUGHAN,
I. V. RANDALL.